(12) United States Patent
Mogre et al.

(10) Patent No.: US 8,373,801 B1
(45) Date of Patent: Feb. 12, 2013

(54) VIDEO SOURCE RESOLUTION DETECTION

(75) Inventors: Advait Mogre, Sunnyvale, CA (US);
Darren Neuman, Palo Alto, CA (US);
Jaewon Shin, Santa Clara, CA (US);
Brian Schoner, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/213,729

(22) Filed: Aug. 19, 2011

(51) Int. Cl.
*H04N 5/21* (2006.01)

(52) U.S. Cl. .......................... 348/607; 348/625; 382/275

(58) Field of Classification Search .................. 348/607, 348/624, 625, 628–631, 672, 558; 382/260–265, 382/275, 298, 168; *H04N 5/21, 5/14*
See application file for complete search history.

(56) References Cited

U.S. PATENT DOCUMENTS

| | | | |
|---|---|---|---|
| 7,724,308 B2* | 5/2010 | Chang | 348/607 |
| 2010/0074558 A1* | 3/2010 | Lim | 382/300 |
| 2010/0111416 A1* | 5/2010 | Meiers | 382/168 |

* cited by examiner

*Primary Examiner* — Sherrie Hsia
(74) *Attorney, Agent, or Firm* — Sterne, Kessler, Goldstein & Fox P.L.L.C.

(57) ABSTRACT

Embodiments for video content source resolution detection are provided. Embodiments enable systems and methods that measure video content source resolution and that provide image-by-image source scale factor measurements to picture quality (PQ) processing modules. With the source scale factor information, PQ processing modules can be adapted dynamically (on a picture-by-picture basis) according to the source scale factor information for better picture quality enhancement. In addition, embodiments provide source resolution detection that is minimally affected by video coding artifacts and superimposed content (e.g., graphics).

20 Claims, 10 Drawing Sheets

VIDEO SOURCE RESOLUTION DETECTION

BACKGROUND

1. Field of the Invention

The present invention relates generally to video content source resolution detection.

2. Background Art

Post-processing picture quality (PQ) enhancement algorithms (e.g., sharpening, de-noising, etc.) can benefit from knowing the source scale factor (i.e., source resolution) of an image a priori, in order to select optimal filter parameter configurations. Accordingly, there is a need for active video content source resolution detection. In addition, it is desirable that source resolution detection be minimally affected by video coding artifacts.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
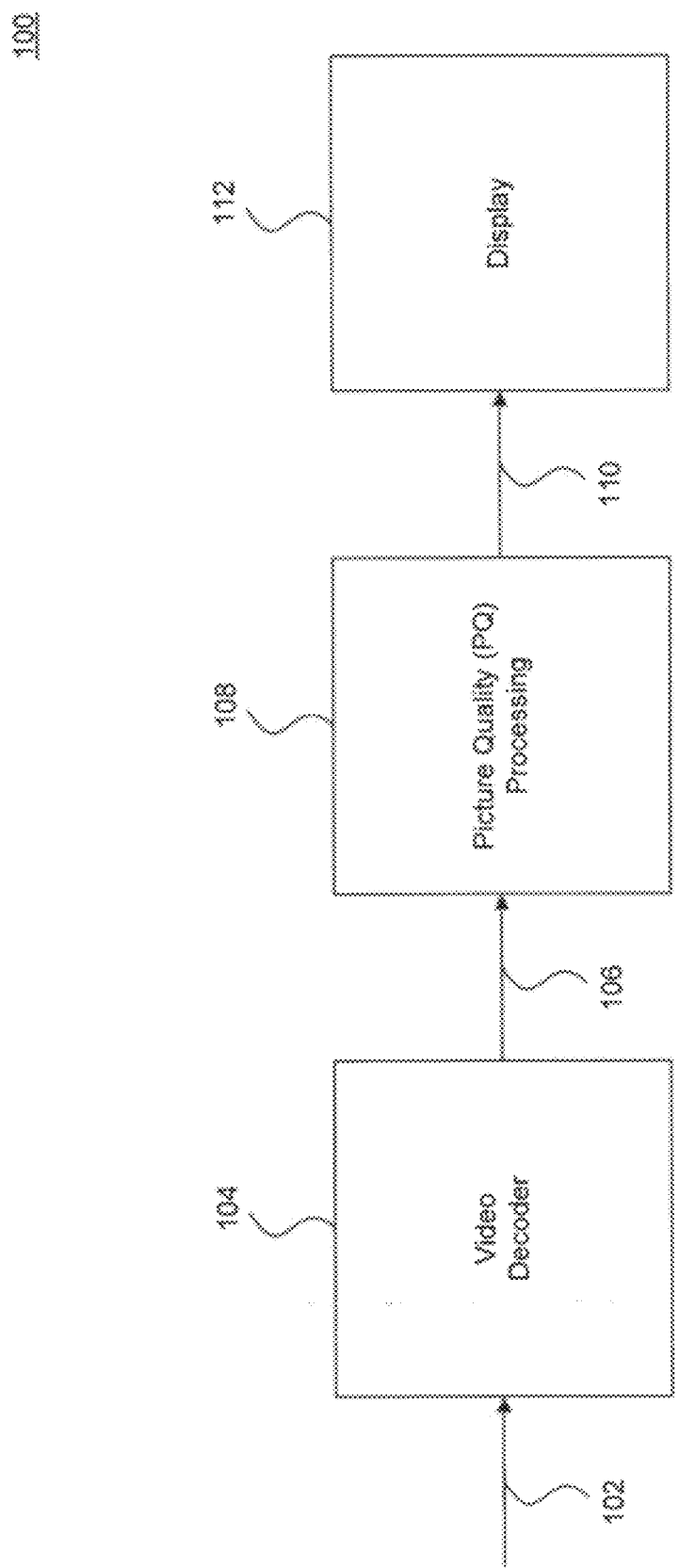
FIG. 1 illustrates an example system for receiving and displaying active video content.

FIG. 1 illustrates an example system 100 for receiving and displaying active video content. System 100 may include a video receiver (e.g., set-top box (STB)) and a television.

As shown in FIG. 1, system 100 includes a video decoder 104, a picture quality (PQ) processing module 108, and a display 112. Video decoder 104 receives an active video content signal 102. Video decoder 104 decodes signal 102 to generate a decoded video signal 106. In an embodiment, video decoder 104 is an MPEG (Moving Picture Experts Group) decoder (e.g., MPEG-1, MPEG-2, MPEG).

PQ processing module 108 applies picture quality enhancement operations on decoded video signal 106 to generate PQ enhanced video signal 110. For example, PQ processing module 108 may implement an image sharpening algorithm, a de-noising algorithm, and/or a de-blurring algorithm. After PQ processing, PQ enhanced video signal 110 is transmitted to display 112 for display.

PQ enhancement algorithms implemented by PQ processing module 108 typically include frequency-dependent operations (e.g., filtering operations). As such, the PQ enhancement algorithms can benefit from knowing the source scale factor (i.e. source resolution) of images contained in decoded signal 106. For example, an image sharpening algorithm can be configured to more efficiently sharpen an image if the image sharpening algorithm has knowledge of the extent of scaling applied to the image at the source (i.e., source scaling factor). An image with native source resolution (i.e., not scaled at the source) (e.g., standard definition (SD)) will typically be processed using different algorithm parameters (e.g., filter parameters) than an image that has been scaled up at the source (e.g., scaled up from SD to High Definition (HD)).

Figure 2:
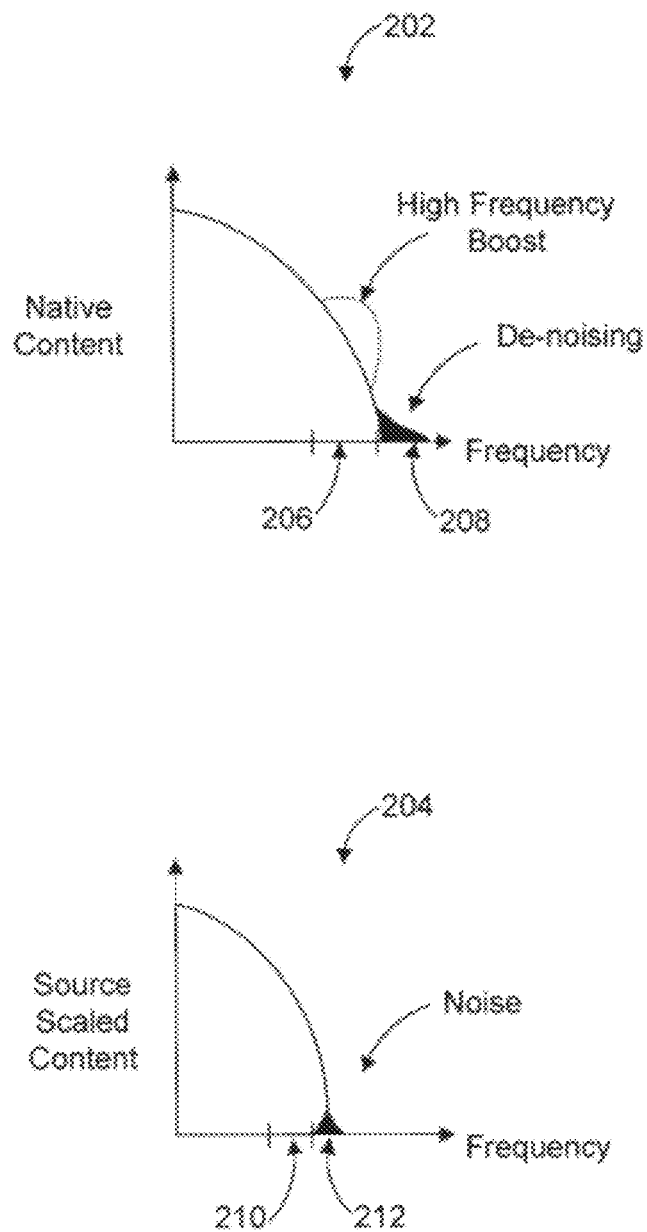
FIG. 2 is an example that illustrates the benefits of video content source scale factor detection to post-processing picture quality (PQ) enhancement.

FIG. 2 is an example that illustrates the benefits of video content source scale factor detection to post-processing picture quality (PQ) enhancement. In particular, FIG. 2 illustrates example frequency content representations 202 and 204 of a native resolution image and of a source scaled version of the same image, respectively. As shown in FIG. 2, the source scaled image has a lower frequency content range than the native resolution image, as edges (i.e., points in the image at which image brightness changes sharply or exhibits discontinuities) in the source scaled image are stretched out in scaling the image.

Without knowledge of the source scale factors of the images, PQ enhancement is applied to both images using the same fixed parameter configurations. For example, as shown in FIG. 2, a high frequency boost operation may be configured to target a frequency range 206. Similarly, a de-noising operation may be configured to occur over a frequency range 208.

Because PQ enhancement is applied using fixed parameter configurations to both images, PQ enhancement may be effective as applied to the native resolution image but not as effective over the scaled-up image, for example (or vice versa). For example, referring to FIG. 2, applying the high frequency boost operation over frequency range 206 would fail to target a desired frequency range 210 of the source scaled image (where a high frequency boost is needed). Similarly, high-frequency noise in the source scaled image 204 may be located over a frequency range 212, which is lower than frequency range 208 where the de-noising is applied. As such, the de-noising operation would not be effective in de-noising the source scaled image 204.

Embodiments of the present invention satisfy the above described need for active video content source resolution detection. In particular, embodiments enable systems and methods that measure video content source resolution and that provide image-by-image source scale factor measurements to PQ processing modules. With the source scale factor information, PQ processing modules can be adapted dynamically (on a picture-by-picture basis) according to the source scale factor information for better picture quality enhancement. In addition, embodiments provide source resolution detection that is minimally affected by video coding artifacts and superimposed content (e.g., graphics).

Figure 3:
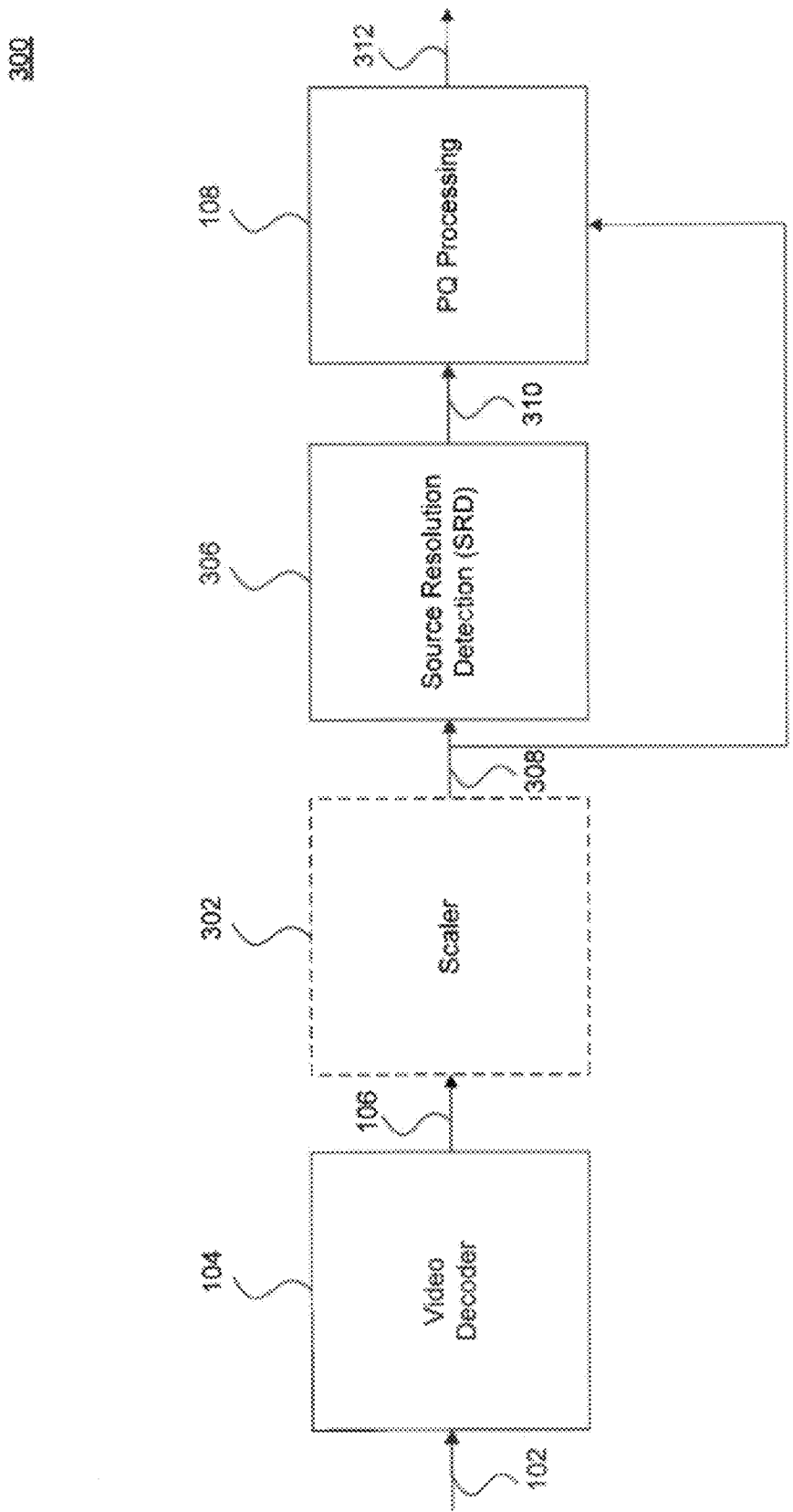
FIG. 3 is a block diagram that illustrates an example video receiver with source resolution detection (SRD) according to an embodiment of the present invention.

FIG. 3 is a block diagram that illustrates an example video receiver 300 with source resolution detection (SRD) according to an embodiment of the present invention. Example video receiver 300 may be part of a set-top box (STB) device, for example.

As shown in FIG. 3, example video receiver 300 includes a video decoder 104 (e.g., MPEG-2 decoder), an optional scaler module 302, a source resolution detection (SRD) module 306, and a PQ processing module 108.

Video decoder 104 is as described above with respect to FIG. 1. As such, video decoder 104 generates a decoded video signal 106 from input active video signal 102. Decoded video signal 106 is provided to an optional scaler module 302.

Scaler module 302 is an optional module in video receiver 300. When present, scaler module 302 applies scaling on an image-by-image basis to decoded video signal 106 and outputs a video signal 308 to SRD module 306. SRD module 306 receives video signal 308 (or video signal 106 when scaler module 302 is not present or used) and performs image-by-image source resolution detection on video signal 308 (or signal 106 when scaler module 302 is not present or used) to generate a signal 310. Signal 310 contains image-by-image source scale factor measurements of images contained in video signal 308 (or signal 106 when scaler module 302 is not present or used). In an embodiment, source scale factor measurements may range from 1.0 to 3.0, with 1.0 indicating a native resolution (or source scaled down) image and 3.0 indicating a highly scaled up image.

In an embodiment, when scaler module 302 is used to scale decoded video signal 106, scaling factors (e.g., on an image-by-image basis) used by scaler 302 are provided to SRD module 306 (not shown in FIG. 3). SRD module 306 compensates source scale factor measurements according to the scaling factors from scaler module 302, to ensure that source scale factor measurements reflect source scaling only.

PQ processing module 108 receives video signal 308 (or video signal 106 when scaler module 302 is not present) and signal 310 from SRD module 306. Using signal 310, PQ processing module 108 (which may include one or more PQ processing sub-modules, implementing various PQ processing algorithms) adapts its processing of video signal 308 (or video signal 106) (on an image-by-image basis, for example) according to the source scale factor information contained in signal 310, to generate PQ enhanced video signal 312.

Figure 4:
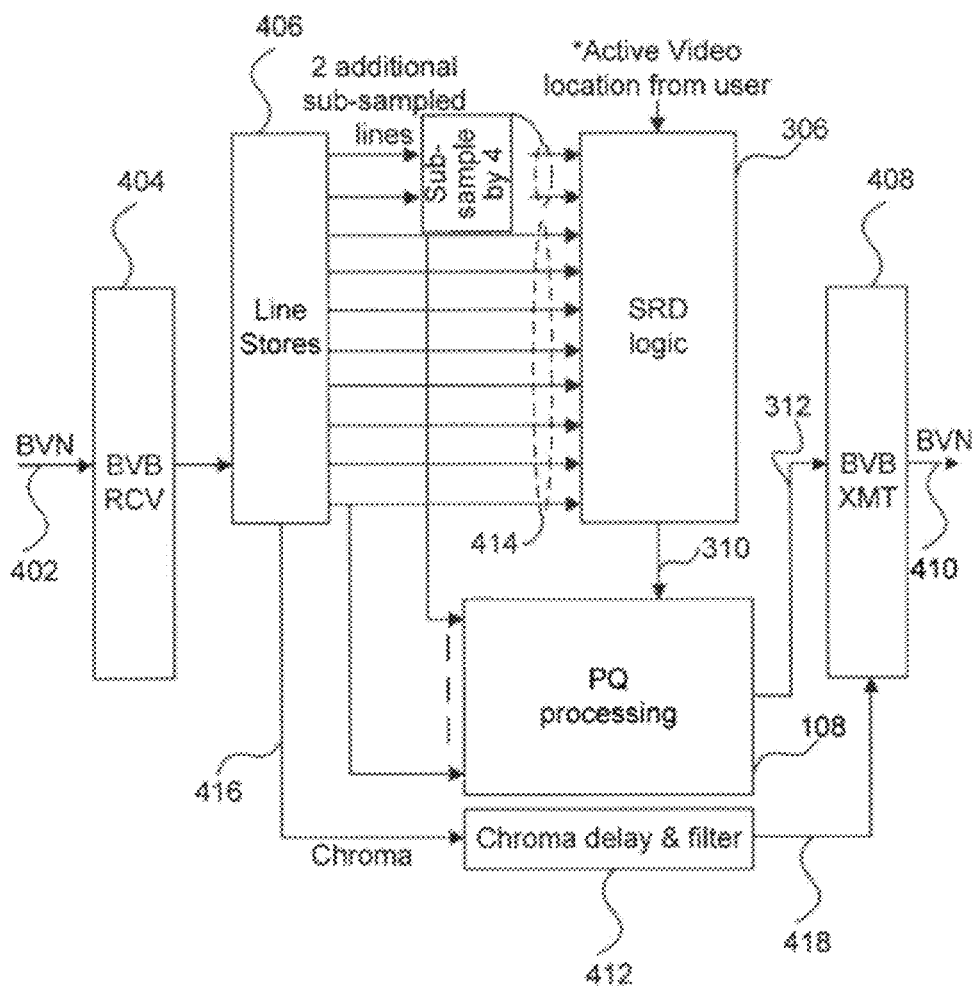
FIG. 4 illustrates an example implementation of portions of a video receiver according to an embodiment of the present invention.

FIG. 4 illustrates an example implementation 400 of portions of a video receiver according to an embodiment of the present invention. Example implementation 400 is provided for the purpose of illustration only, and is not limiting of embodiments of the present invention.

As shown in FIG. 4, example implementation 400 includes a receive port 404, a plurality of line stores 406, a SRD module 306, a PQ processing module 108, a Chroma delay and filter module 412, and a transmit port 408.

Input video signal 402 is received by receive port 404 and forwarded to line stores 406. Line stores 406 store lines of pixels from video signal 402, and periodically output a set of pixel lines 414 (e.g., 8 or 10 lines) containing luma (luminance) pixel information to SRD module 306 and corresponding pixel lines 416 containing chroma information (of the same pixels) to chroma delay and filter module 412.

SRD module 306 is as described above with respect to FIG. 3. In particular, SRD module 306 processes the set of pixel lines 414 from line stores 406 to generate signal 310. In an embodiment, SRD module 306 generates signal 310 after processing multiple sets of pixel lines 414 that form a complete image. Signal 310 thus contains image-by-image source scale factor measurements of images contained in video signal 402.

SRD module 306 provides signal 310 to PQ processing module 108. PQ processing module 108 additionally receives the same set of pixel lines 414 (containing luma pixel information) as received by SRD module 306, from line stores 406. PQ processing module 108 uses signal 310 to enhance the PQ processing (e.g., sharpening, de-noising, etc.) applied to pixel lines 414.

PQ processing module 108 outputs PQ enhanced video signal 312 to transmit port 408. Simultaneously, transmit port 408 receives a delayed and filtered version 418 of pixel lines 416 (which contain the chroma information). Transmit port 408 combines PQ enhanced signal 312 (containing the luma information) and signal 418 to generate an output signal 410. In an embodiment, signal 410 contains the full pixel information (i.e., luma and chroma) of an entire PQ enhanced image of input video signal 402.

Figure 5:
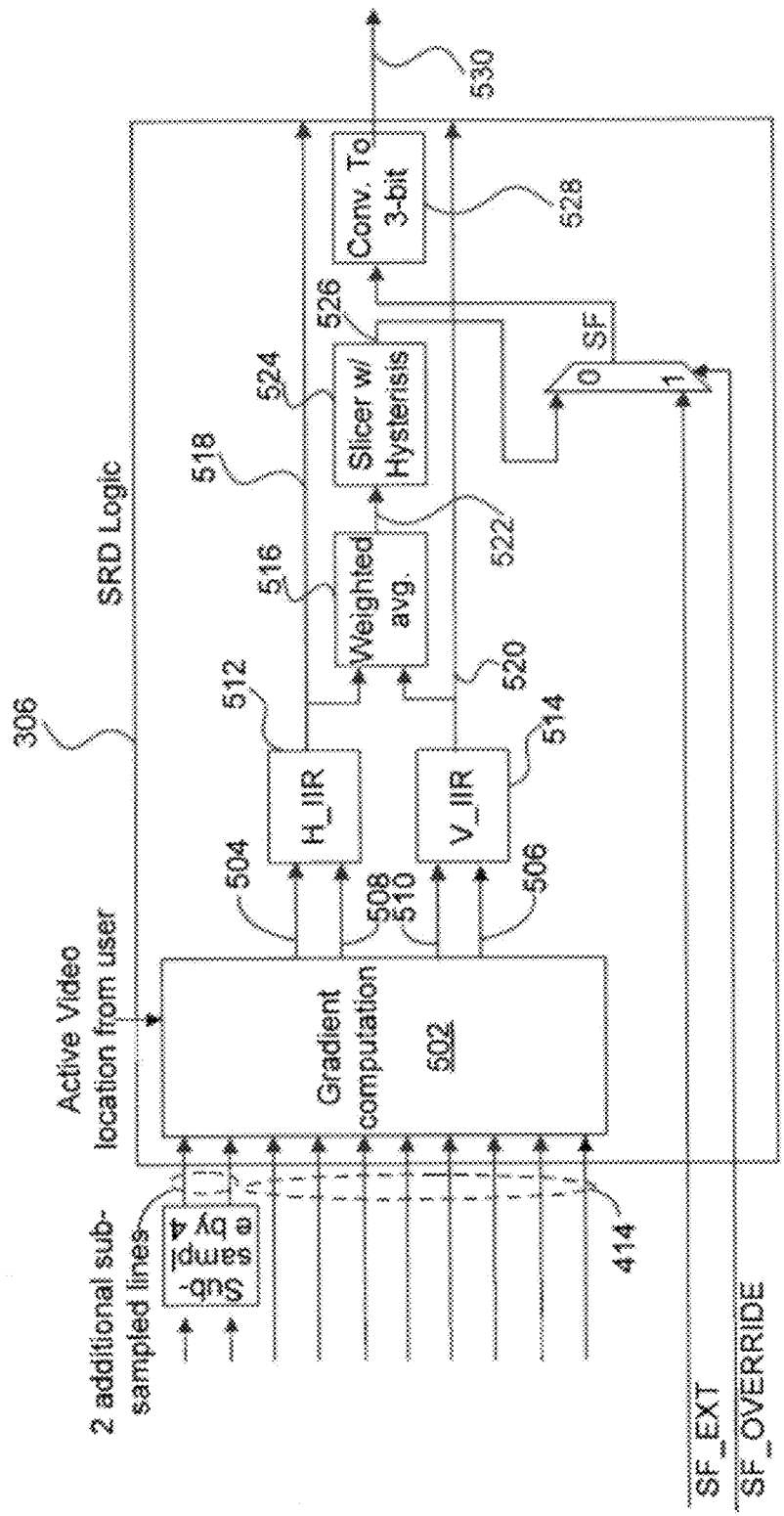
FIG. 5 illustrates an example implementation of a source resolution detection (SRD) module according to an embodiment of the present invention.

FIG. 5 illustrates an example implementation 500 of source resolution detection (SRD) module 306 according to an embodiment of the present invention. Example implementation 500 is provided for the purpose of illustration only, and is not limiting, of embodiments of the present invention.

As shown in FIG. 5, example implementation 500 includes a gradient computation module 502, a horizontal infinite input response (IIR) filter 512, a vertical IIR filter 514, an averaging module 516, a slicer module 524, and converter module 528.

Gradient computation module 502 periodically receives a set of pixel lines 414 (from line stores 406, for example, as shown in FIG. 4) containing luma pixel information of a line of pixels of an image. Gradient computation module 502 processes the set of pixel lines 414 to generate a horizontal gradient 504 and a vertical gradient 506 of the image or of a defined region of the image. In an embodiment, gradient computation module 502 processes multiple sets of pixel lines 414 to generate the horizontal and vertical gradients 504 and 506 of the image. In an embodiment, gradient computation module 502 performs a process as described further below in FIG. 7. An example implementation of gradient computation module 502 according to an embodiment is described in FIG. 6 below.

Additionally, gradient computation module 502 calculates a horizontal gradient confidence 508 associated with horizontal gradient 504 of the image, and a vertical gradient confidence 510 associated with vertical gradient 506 of the image. Horizontal gradient confidence 508 and vertical gradient confidence 510 indicate respective confidence levels associated with the determined horizontal gradient 504 and vertical gradient 506.

Horizontal IIR filter 512 receives horizontal gradient 504 and horizontal gradient confidence 508 from gradient computation module 502, and generates a filtered horizontal gradient 518. Similarly, vertical IIR filter 514 receives vertical gradient 506 and vertical gradient confidence 510 from gradient computation module 502, and generates a filtered vertical gradient 520. In an embodiment, horizontal IIR filter 512 and vertical IIR filter 514 are identical 2-tap IIR filters, each with an adaptive pole. The pole of each filter is adapted according to the gradient confidence value (508 or 510) associated with the respective (local/vertical) gradient that the filter processes.

Averaging module 516 receives filtered horizontal gradient 518 and filtered vertical gradient 520 from horizontal IIR filter 512 and vertical IIR filter 514, respectively. In an embodiment, averaging module 516 calculates an overall gradient 522 of the image based on a weighted average of filtered horizontal and vertical gradients 518 and 520. According to embodiments, averaging module 516 includes a horizontal gradient weight and a vertical gradient weight used in calculating the weighted average. The horizontal gradient weight and a vertical gradient weight are user programmable, and may be set to equal or different values.

Slicer module 524 receives overall gradient 522 from averaging module 516, and maps (slices) overall gradient 522 to one of a plurality of quantized levels to generate an output signal 526. In an embodiment, slicer module 524 implements approximately 20 quantized levels. This granularity provided by the quantized levels allows flexibility in terms of filter selection for artifact removal. In another embodiment, slicer module 524 further implements hysteresis. As such, output signal 526 of slicer module 524 (which represents the quantized level for a given overall gradient input) changes only when the difference between the current quantized level (determined based on the current overall gradient input) and the previous quantized level (i.e., previous output of slicer 524) is greater than a programmable hysteresis threshold.

Converter module 528 receives signal 526 from slicer module 524 (which contains one of the plurality of quantized levels) and converts the quantized level contained in signal 526 into a source scale factor 530. In an embodiment, slicer quantized levels are converted to a source scale factor according to a predetermined formula. In an embodiment, source scale factor measurements are defined from 1.0 to 3.0, with 1.0 indicating a native resolution (or source scaled down) image and 3.0 indicating a highly scaled up image.

Figure 6:
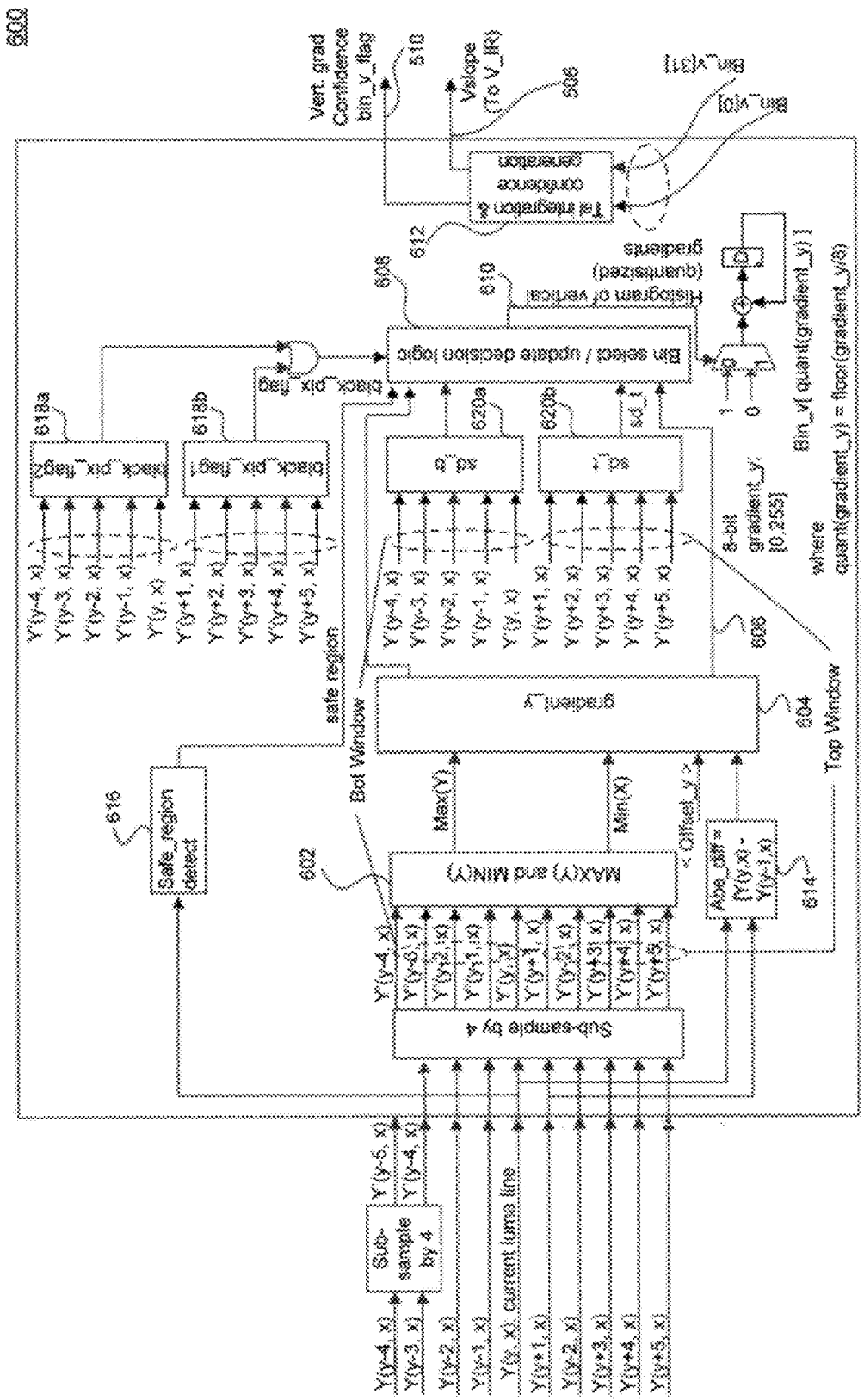
FIG. 6 illustrates an example implementation of a gradient computation module of a SRD module according to an embodiment of the present invention.

FIG. 6 illustrates an example implementation 600 of a portion of gradient computation module 502 according to an embodiment of the present invention. In particular, example implementation 600 represents the vertical gradient block (i.e., the block that determines vertical gradient 504 and vertical gradient confidence 510) of gradient computation module 502. The horizontal gradient block of gradient computation module 502 is similar to the vertical gradient block and therefore will not be described. Example implementation 600 is provided for the purpose of illustration only, and is not limiting of embodiments of the present invention.

As shown in FIG. 6, example implementation 600 includes, among other modules and components, sub-modules 602, 604, 608, 612, 614, 616, 618a, 618b, 620a, and 620b.

In an embodiment, example implementation 600 performs a process as described further below in FIG. 7. As such, example implementation 600 includes logic, including sub-modules 602, 604, and 614, that calculates a local vertical gradient of a pixel using luma information of the pixel and of one or more adjacent vertical pixels. In an embodiment, the local vertical gradient of the pixel is normalized using the luma information of a predefined vertical pixel window, centered around the pixel and having a predefined size.

In an embodiment, sub-modules 602, 604, and 614 implement the following formula to calculate the local vertical gradient of the pixel:

$$\text{gradient}\_y = |Y(y+1,x) - Y(y,x)| * 256 / (\text{MAX}(Y) - \text{MIN}(Y) + \text{GRADY\_BIAS\_OUT}),$$

where gradient_y represents the local vertical gradient, $Y(y,x)$ represents a luma value of the pixel, $Y(y+1,x)$ represents a luma value of a pixel immediately below the pixel within the image, MAX(Y) represents a maximum luma value over the vertical pixel window, MIN(Y) represents a minimum luma value over the vertical pixel window, and GRADY_BIAS_OUT represents a vertical bias value.

Accordingly, sub-module 602 receives a set of pixel lines representing luma information of the vertical pixel window and determines the MAX(Y) and the MIN(Y) terms in the above gradient formula. Sub-module 614 receives the luma information of the pixel and of the pixel immediately below the pixel in the image, and calculates the term $|Y(y+1, x) - Y(y,x)|$ in the above formula. Sub-module 604 receives the MAX(Y) and MIN(Y) values from sub-module 602 and the $|Y(y+1, x) - Y(y,x)|$ value from sub-module 614, and implements the above formula to generate the local vertical gradient 606 of the pixel.

Example implementation 600 further includes logic, including sub-modules 608, 616, 618a, 618b, 620a, and 620b, that associate the calculated local vertical gradient of the pixel (or alternatively, determines whether or not to associate the calculated vertical gradient, and then either associates or discards the calculated vertical gradient) with one of a plurality of vertical bins. In an embodiment, the range of possible gradient values (e.g., 0 to 255) is divided into a plurality of bins. For example, in an embodiment, 32 bins are used, with each bin having 8 consecutive gradient levels. The calculated local vertical gradient is associated, based on its value, with the vertical bin within which it falls.

Accordingly, sub-module 608 receives local vertical gradient 606 from sub-module 606, determines whether or not to associate local vertical gradient 606 with one of the plurality of vertical bins, and then either associates local vertical gradient 606 with a selected bin or discards local vertical gradient 606. As pixels are processed as described above, sub-module 608 generates a running histogram 610 of local vertical gradients, wherein the histogram 610 indicates for each bin of the plurality of vertical bins a respective count of local vertical gradients associated with that bin.

In an embodiment, sub-module 608 receives control signals from sub-modules 616, 618a, 618b, 620a, and 620b, which it uses to determine whether to associate local vertical gradient 606 with one of the plurality of vertical bins or to discard local vertical gradient 606.

In particular, sub-module 616 provides a "safe region detect" signal to sub-module 608, which indicates whether or not the pixel (for which local vertical gradient 606 was calculated) is located in a safe region of the image. The safe region of the image is a region of the image within which local gradient measurements are assumed to be "safe" (or minimally affected) from the effects of letter-box, pillar-box, and postage stamp graphics (which may be superimposed on the image).

Sub-modules 618a and 618b each processes a respective half of the vertical pixel window (e.g., top window and bottom window) to determine the presence of black borders superimposed on the image. In particular, sub-module 618a detects the presence of "black" pixels at pixel locations (y−3, x) and (y−4,x) (lower most edge of the bottom window) and sub-module 618b detects the presence of "black" pixels at pixel locations (y+4,x) and (y+5,x) (upper most edge of the top window). The outputs of sub-modules 618a and 618b are used by sub-module 608 to ensure that black edges do not unduly influence the gradient computation process (typically, pixels adjacent to a black border region would yield uncharacteristically high gradient values, which would mislead the SRD module into determining that the image is un-scaled or native resolution. Sub-modules 618a and 618b help avoid such scenarios).

Sub-modules 620a and 620b each processes a respective half of the vertical pixel window (e.g., top window and bottom window) to compute an approximation of the standard deviation of the respective half of the vertical pixel window that it processes. The standard deviation information is provided to sub-module 608 and is used in determining which local gradients to retain or discard. In an embodiment, the standard deviation information is used to detect and avoid retaining local gradients resulting from noisy or near Nyquist regions. In particular, when the vertical luma spatial variation is close to Nyquist, the interpolated pixels amidst a region of high frequency might yield a gradient that is unreliable. The standard deviation information helps avoid selecting gradients within such regions of high spatial (near Nyquist) activity.

Example implementation 600 further includes logic, including sub-module 612, that determines the vertical gradient of the image from the generated histogram of local vertical gradients. Accordingly, sub-module 612 receives histogram 610 of local vertical gradients from sub-module 608 and determines vertical gradient 510 of the image based on histogram 610. In an embodiment, sub-module 612 performs an iterative tail integration (i.e., beginning from the highest index bin and moving backwards) of histogram 610 to generate a running integration (sum), until the running integration exceeds a predefined threshold. The frequency bin of the plurality of vertical frequency bins for which the running integration just exceeds the predefined threshold is determined, and the vertical gradient of the image is calculated based on an index of that frequency bin.

Figure 7:
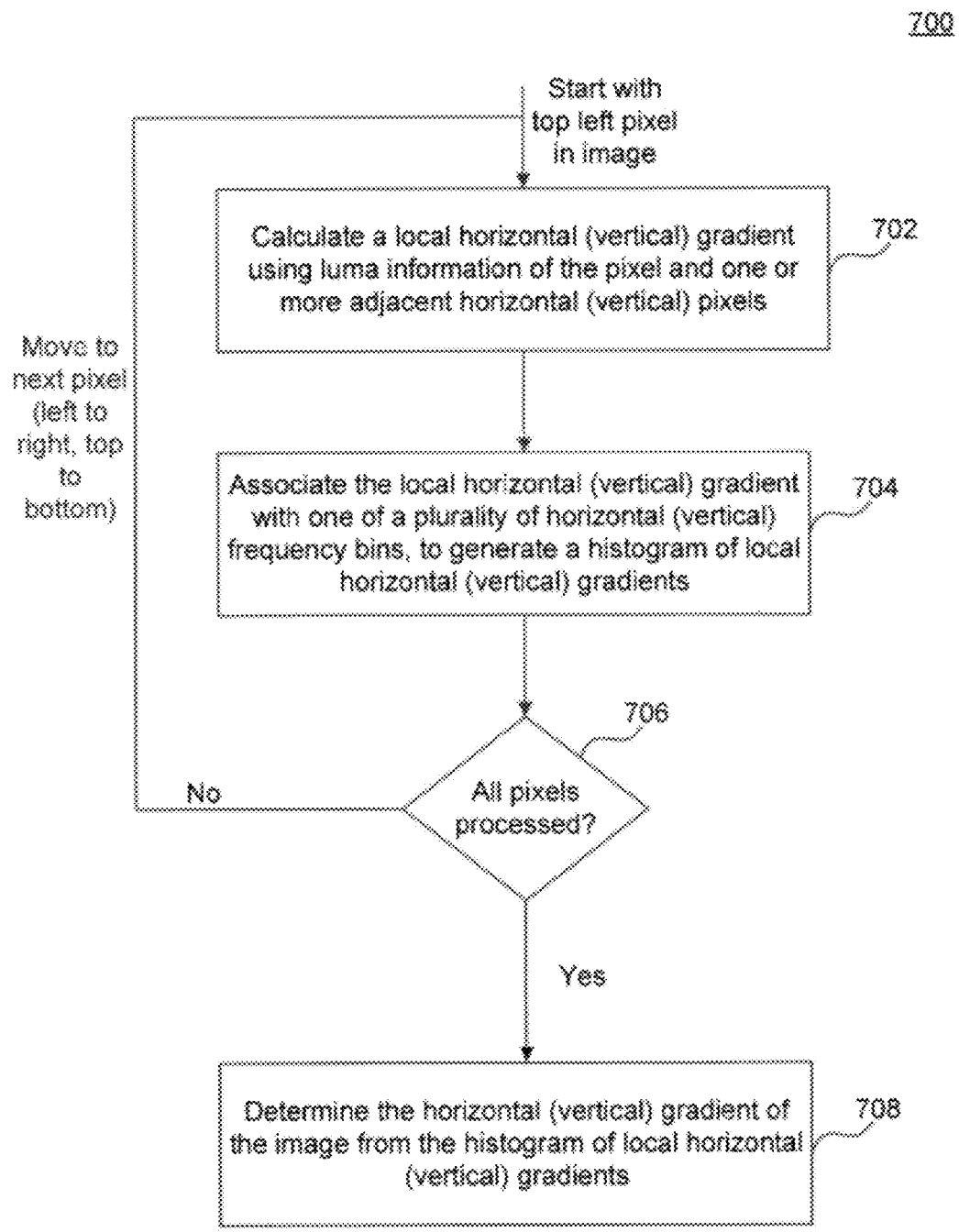
FIG. 7 is a process flowchart of an example method for calculating horizontal/vertical gradients of an image according to an embodiment of the present invention.

FIG. 7 is a process flowchart 700 of an example method for calculating horizontal/vertical gradients of an image according to an embodiment of the present invention. In implementation, two separate instances of process 700 are performed simultaneously to calculate in parallel the horizontal gradient and the vertical gradient of the image.

As shown in FIG. 7, process 700 starts with the top left pixel in the image. Alternatively, process 700 may be configured to start from a different pixel location in the image. In other embodiments, process 700 starts with the top left pixel in a defined region of the image over which gradient computation is performed. The defined region may or may not encompass the entire image.

Process 700 begins in step 702, which includes calculating a local horizontal (or vertical) gradient of the pixel using luma information of the pixel and of one or more adjacent horizontal (vertical) pixels. In an embodiment, the local horizontal (or vertical) gradient of the pixel is normalized using the luma information of a predefined horizontal (vertical) pixel window. The pixel window is centered around the pixel and has a predefined size (e.g., ten pixels wide).

In an embodiment, the local horizontal gradient of the pixel is calculated according to the following formula:

$$\text{gradient\_}x = |Y(y,x+1) - Y(y,x)| * 256 / (\text{MAX}(Y) - \text{MIN}(Y) + \text{GRADX\_BIAS\_OUT}),$$

where gradient_x represents the local horizontal gradient of the pixel, Y(y,x) represents the luma value of the pixel, Y(y,x+1) represents the luma value of a pixel immediately adjacent to the right of the pixel within the image, MAX(Y) represents the maximum luma value over a horizontal pixel window centered around the pixel, MIN(Y) represents the minimum luma value over the horizontal pixel window, and GRADX_BIAS_OUT represents a horizontal bias value.

Correspondingly, the local vertical gradient of the pixel is calculated according to the following formula:

$$\text{gradient\_}y = |Y(y+1,x) - Y(y,x)| * 256 / (\text{MAX}(Y) - \text{MIN}(Y) + \text{GRADY\_BIAS\_OUT}),$$

where gradient_y represents the local vertical gradient, Y(y,x) represents a luma value of said each pixel, Y(y+1,x) represents a luma value of a pixel immediately below said each pixel within the image, MAX(Y) represents a maximum luma value over a vertical pixel window centered around said each pixel, MIN(Y) represents a minimum luma value over the vertical pixel window, and GRADY_BIAS_OUT represents a vertical bias value.

Figure 8:
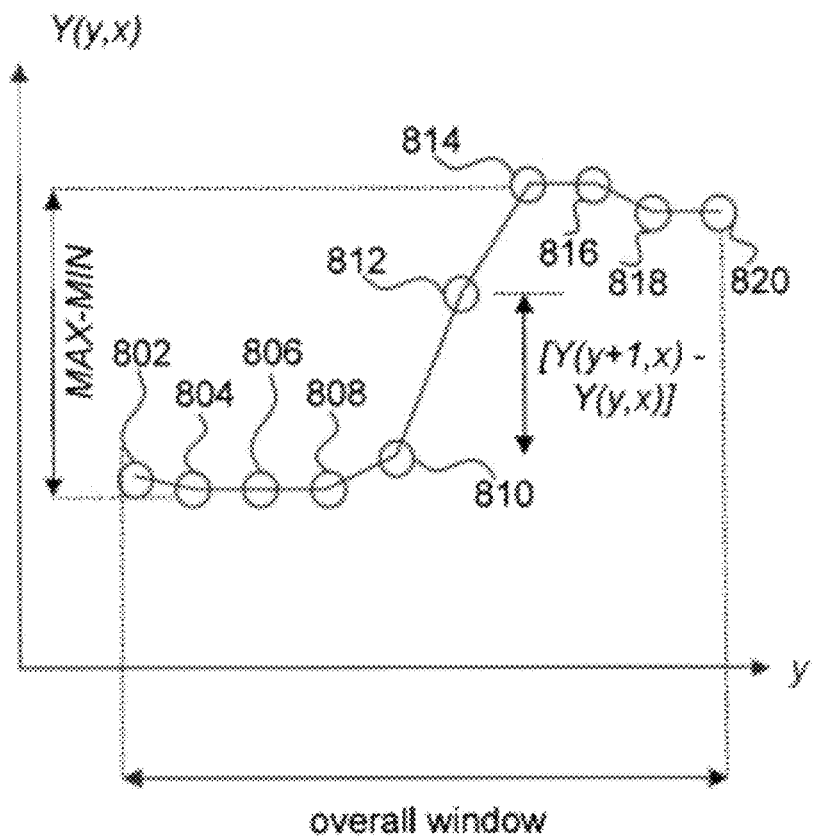
FIG. 8 is an example that illustrates local vertical gradient computation for a pixel according to an embodiment of the present invention.

FIG. 8 is an example 800 that illustrates local vertical gradient computation for a pixel 810 according to an embodiment of the present invention. As shown in FIG. 8, a vertical pixel window (approximately centered around pixel 810) that includes ten pixels 802, 804, 806, 808, 810, 812, 814, 816, 818, and 820 is selected. The vertical gradient is calculated as the difference between the luma value of pixel 812 (the term Y(y+1,x) in the local vertical gradient formula) and the luma value of pixel 810 (the term Y(y,x) in the local vertical gradient formula), multiplied by a factor (e.g., 256), and then divided by the difference between the maximum luma value in the pixel window (the luma value of pixel 814, which corresponds to the term MAX(Y) in the local vertical gradient formula) and the minimum luma value in the pixel window (the luma value of pixel 808, which corresponds to the term MIN(Y) in the local vertical bias value.

As would be apparent to a person of skill in the art based on the teachings herein, local horizontal gradient computation for a pixel is performed in a similar manner as local vertical gradient computation.

Referring back to process 700, step 704 includes associating the calculated local horizontal (vertical) gradient of the pixel with one of a plurality of horizontal (vertical) frequency bins. In an embodiment, the range of possible gradient values (e.g., 0 to 255) is divided into a plurality of bins. For example, in an embodiment, 32 bins are used, with each bin having 8 consecutive gradient levels. The calculated local horizontal (vertical) gradient is associated, based on its value, with the horizontal (vertical) bin within which it falls.

Subsequently, step 706 includes determining whether or not all pixels in the image (or in the defined region of the image) have been processed.

If not all pixels have been processed, process 700 returns to step 702 to process the next pixel in the image, moving in a left to right, top to bottom manner through the pixels of the image. As pixels are processed according to steps 702 and 704, a histogram of local horizontal (vertical) gradients is generated. The histogram indicates for each bin of the plurality of horizontal (vertical) bins a respective count of local horizontal (vertical) gradients associated with that bin.

Otherwise, if all pixels have been processed, process 700 proceeds to step 708, which includes determining the horizontal (vertical) gradient of the image from the histogram of local horizontal (vertical) gradients. In an embodiment, determining the horizontal (vertical) gradient of the image includes performing an iterative tail integration (i.e., beginning from the highest index bin and moving backwards) of the histogram of local horizontal (vertical) gradients to generate a running integration (sum), until the running integration exceeds a predefined threshold. The frequency bin of the plurality of horizontal (vertical) frequency bins for which the running integration just exceeds the predefined threshold is determined, and the horizontal (vertical) gradient of the image is calculated based on an index of that frequency bin.

Figure 9:
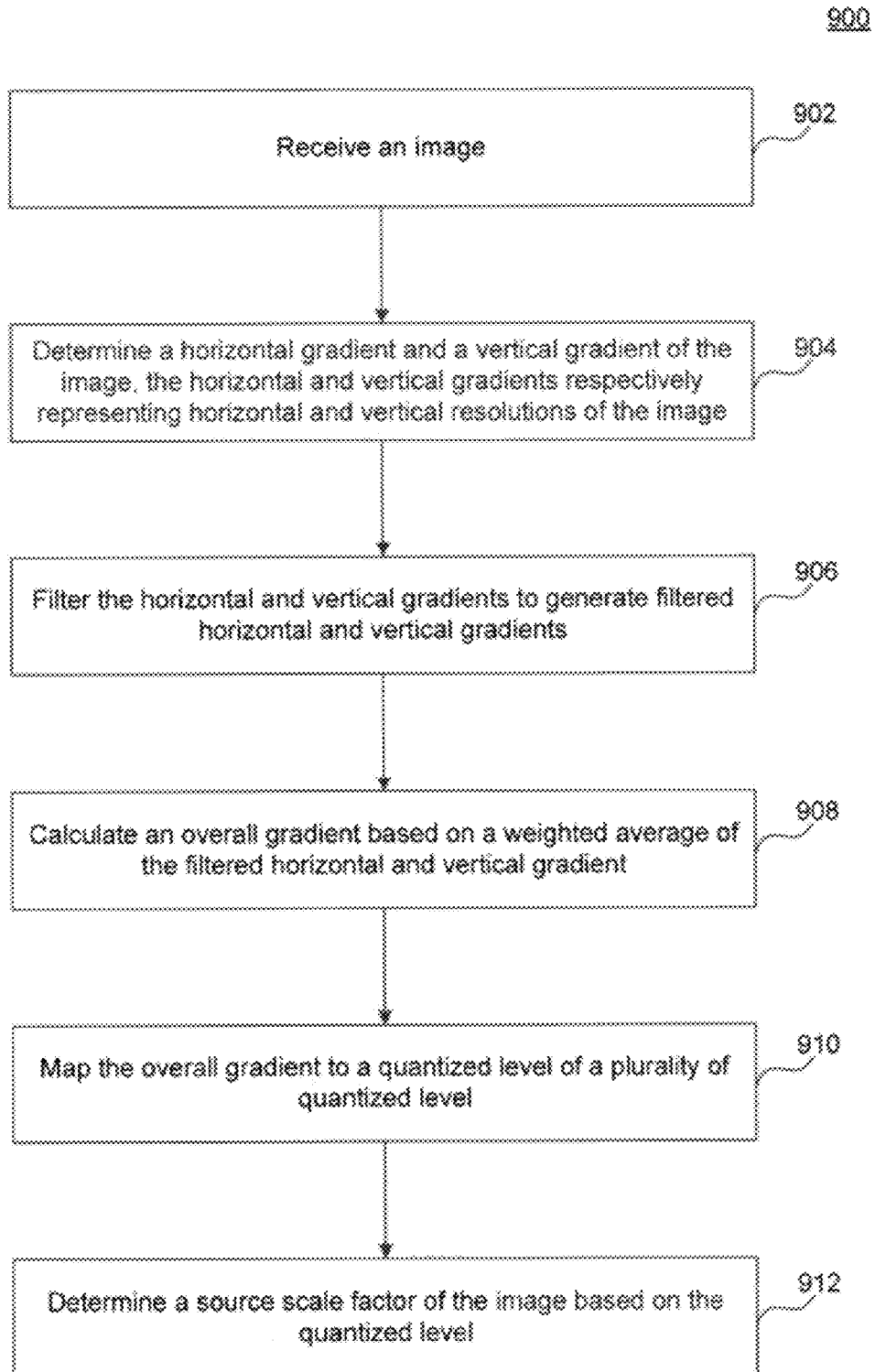
FIG. 9 is a process flowchart of an example method for determining a source scale factor of an image according to an embodiment of the present invention.

FIG. 9 is a process flowchart 900 of an example method for determining a source scale factor of an image according to an embodiment of the present invention. Process 900 may be performed by example system 500 described above, for example.

Process 900 begins in step 902, which includes receiving an image. The image may be from an active video signal (but is not limited as such according to embodiments), such as a video decoder (e.g., MPEG-2 decoder) output signal. The image may be a native resolution image or a source scaled (up or down) image.

Subsequently, in step 904, process 900 includes determining a horizontal gradient and a vertical gradient of the image. In an embodiment, the horizontal and vertical gradients of the image are each calculated according to process 700 described above, using gradient-based processing the image or a defined region of the image. The horizontal and vertical gradients respectively represent horizontal and vertical resolutions of the image. In an embodiment, step 902 is performed using a gradient computation module, such as gradient computation module 502, described above in FIGS. 5 and 6.

Process 900 then proceeds to step 906, which includes filtering the horizontal and vertical gradients to generate filtered horizontal and vertical gradients. In an embodiment, step 906 includes applying respective infinite input response (IIR) filtering to the horizontal and vertical gradients to smoothen the horizontal and vertical gradients. In an embodiment, step 906 is performed using two identical 2-tap IIR filters, each with an adaptive pole. The pole of each filter is adapted according to a gradient confidence value associated with the respective (horizontal/vertical) gradient that the filter processes.

Subsequently, in step 908, process 900 includes calculating an overall gradient of the image based on a weighted average of the filtered horizontal and vertical gradients. According to embodiments, a horizontal gradient weight and a vertical gradient weight using in calculating the weighted average are user programmable. The horizontal gradient weight and the vertical gradient weight may be set to be equal or different than each other.

Then, in step 910, process 900 includes mapping the overall gradient of the image to a quantized level of a plurality of quantized levels. In an embodiment, approximately 20 quantized levels are used. This granularity provided by the quantized levels allows flexibility in terms of filter selection for artifact removal, sharpening filter selection, etc. In an embodiment, step 910 is performed using a slicer module, such as slicer module 524 described above in FIG. 5. As such, the output of the slicer module (which represents the quantized level for a given overall gradient input) changes only when the difference between the current quantized level and the previous quantized level is greater than a programmable hysteresis threshold.

Finally, step 912 of process 900 includes determining a source scale factor of the image based on the quantized level resulting from step 910. In an embodiment, step 912 includes converting the quantized level to a source scale factor (e.g., a value between 1.0 and 3.0) of the image according to a predetermined formula. In an embodiment, source scale factor measurements are defined from 1.0 to 3.0, with 1.0 indicating a native resolution (or source scaled down) image and 3.0 indicating a highly scaled up image.

Figure 10:
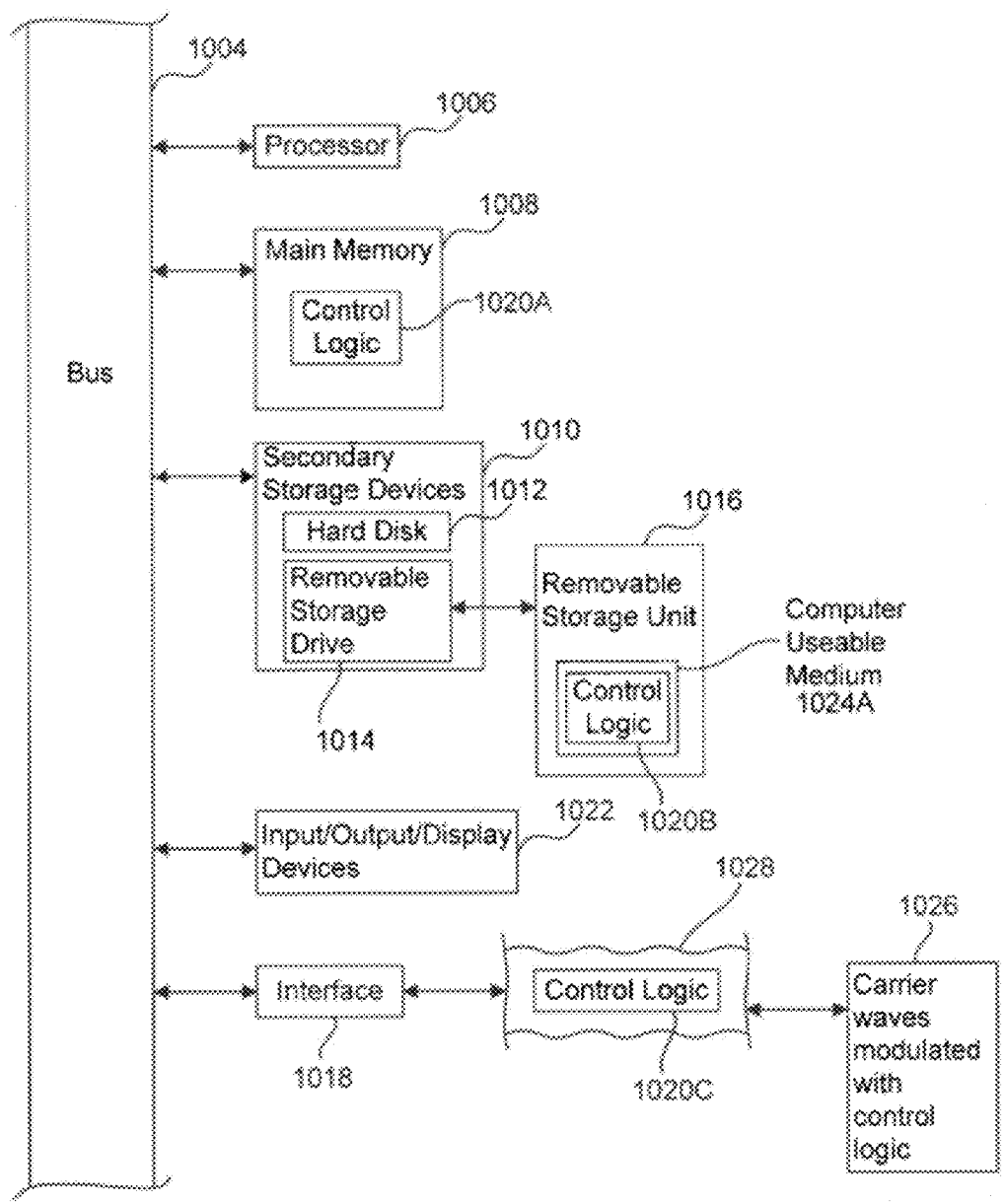
FIG. 10 is an example computer system capable of implementing embodiments of the present invention.

Various aspects of embodiments the present invention can be implemented using software, firmware, hardware, or a combination thereof. FIG. 10 illustrates an example computer system 1000 in which embodiments of the present invention, or portions thereof, can be implemented as computer-readable code. For example, the methods illustrated by process flowcharts 700 and 900 can be implemented in system 1000. However, after reading this description, it will become apparent to a person skilled in the relevant art how to implement embodiments using other computer systems and/or computer architectures.

Computer system 1000 includes one or more processors, such as processor 1006. Processor 1006 can be a special purpose or a general purpose processor. Processor 1006 is connected to a communication infrastructure 1004 (for example, a bus or network).

Computer system 1000 also includes a main memory 1008 (e.g., random access memory (RAM)) and secondary storage devices 1010. Secondary storage 1010 may include, for example, a hard disk drive 1012, a removable storage drive 1014, and/or a memory stick. Removable storage drive 1014 may comprise a floppy disk drive, a magnetic tape drive, an optical disk drive, a flash memory, or the like. Removable storage drive 1014 reads from and/or writes to a removable storage unit 1016 in a well-known manner. Removable storage unit 1016 may comprise a floppy disk, magnetic tape, optical disk, etc. which is read by and written to by removable storage drive 1014. As will be appreciated by persons skilled in the relevant art(s), removable storage unit 1016 includes a computer usable storage medium 1024A having stored therein computer software and/or logic 1020B.

Computer system 1000 may also include a communications interface 1018. Communications interface 1018 allows software and data to be transferred between computer system 1000 and external devices. Communications interface 1018 may include a modem, a network interface (such as an Ethernet card), a communications port, a PCMCIA slot and card, or the like. Software and data transferred via communications interface 1018 are in the form of signals which may be electronic, electromagnetic, optical, or other signals capable of being received by communications interface 1018. These signals are provided to communications interface 1018 via a communications path 1028. Communications path 1028 carries signals and may be implemented using wire or cable, fiber optics, a phone line, a cellular phone link, an RF link or other communications channels.

In this document, the terms "computer usable medium" and "computer readable medium" are used to generally refer to media such as removable storage unit 1016 and a hard disk installed in hard disk drive 1012. Computer usable medium can also refer to memories, such as main memory 1008 and secondary storage devices 1010, which can be memory semiconductors (e.g. DRAMs, etc.).

Computer programs (also called computer control logic) are stored in main memory 1008 and/or secondary storage devices 1010. Computer programs may also be received via communications interface 1018. Such computer programs, when executed, enable computer system 1000 to implement embodiments of the present invention as discussed herein. In particular, the computer programs, when executed, enable processor 1006 to implement the processes of the present invention. Where embodiments are implemented using software, the software may be stored in a computer program product and loaded into computer system 1000 using removable storage drive 1014, interface 1018, or hard drive 1012.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A method, comprising:
receiving an image;
determining a horizontal gradient and a vertical gradient of the image, the horizontal and vertical gradients respectively representing horizontal and vertical resolutions of the image;
filtering the horizontal and vertical gradients to generate filtered horizontal and vertical gradients;
calculating an overall gradient based on a weighted average of the filtered horizontal and vertical gradients;
mapping the overall gradient to a quantized level of a plurality of quantized levels; and
determining a source scale factor of the image based on he quantized level.

2. The method of claim 1, wherein the image is a source scaled image.

3. The method of claim 1, wherein the image is a native resolution image.

4. The method of claim 1, wherein determining the horizontal gradient and the vertical gradient of the image comprises:
for each pixel of a plurality of pixels of the image,
calculating a local horizontal gradient using luma information of said each pixel and one or more adjacent horizontal pixels;
calculating a local vertical gradient using luma information of said each pixel and one or more adjacent vertical pixels;
associating the local horizontal gradient with one of a plurality of horizontal frequency bins; and
associating the local vertical gradient with one of a plurality of vertical frequency bins.

5. The method of claim 4, wherein the local horizontal gradient for said each pixel is calculated according to:

$$\text{gradient\_}x = |Y(y,x+1)-Y(y,x)|*256/(\text{MAX}(Y)-\text{MIN}(Y)+\text{GRAD}X\_\text{BIAS\_OUT})$$

where gradient_x represents the local horizontal gradient, Y(y,x) represents a luma value of said each pixel, Y(y, x+1) represents a luma value of a pixel immediately adjacent to the right of said each pixel within the image, MAX(Y) represents a maximum luma value over a horizontal pixel window centered around said each pixel, MIN(Y) represents a minimum luma value over the horizontal pixel window, and GRADX_BIAS_OUT represents a horizontal bias value.

6. The method of claim 5, wherein the local vertical gradient for said each pixel is calculated according to:

$$\text{gradient\_}y = |Y(y+1,x)-Y(y,x)|*256/(\text{MAX}(Y)-\text{MIN}(Y)+\text{GRAD}Y\_\text{BIAS\_OUT})$$

where gradient_y represents the local vertical gradient, Y(y,x) represents a luma value of said each pixel, Y(y+1,x) represents a luma value of a pixel immediately below said each pixel within the image, MAX(Y) represents a maximum luma value over a vertical pixel window centered around said each pixel, MIN(Y) represents a minimum luma value over the vertical pixel window, and GRADY_BIAS_OUT represents a vertical bias value.

7. The method of claim 6, wherein the horizontal pixel window and the vertical pixel window each includes ten pixels of the image.

8. The method of claim 4, further comprising:
generating a histogram of local horizontal gradients, said histogram indicating for each bin of the plurality of horizontal frequency bins a respective count of local horizontal gradients associated with said each bin; and
generating a histogram of local vertical gradients, said histogram indicating for each bin of the plurality of vertical frequency bins a respective count of local vertical gradients associated with said each bin.

9. The method of claim 8, wherein determining the horizontal gradient and the vertical gradient of the image further comprises:
determining the horizontal gradient of the image from the histogram of local horizontal gradients; and
determining the vertical gradient of the image from the histogram of local vertical gradients.

10. The method of claim 9, wherein determining the horizontal gradient of the image further comprises:
iteratively integrating the histogram of local horizontal gradients starting from a highest index bin of the plurality of horizontal frequency bins to produce a running integration, until the running integration exceeds a predefined threshold;
determining a frequency bin of the plurality of horizontal frequency bins for which the running integration just exceeds the predefined threshold; and
determining the horizontal gradient of the image based on an index of said determined frequency bin.

11. The method of claim 1, further comprising:
calculating a horizontal gradient confidence associated with the horizontal gradient of the image, and a vertical gradient confidence associated with the vertical gradient of the image.

12. The method of claim 11, wherein said filtering comprises:
filtering the horizontal and vertical gradients using first and second infinite input response (IIR) filters respectively, wherein a pole of the first IIR filter is adapted according to the horizontal gradient confidence and a pole of the second IIR filter is adapted according to the vertical gradient confidence.

13. The method of claim 1, wherein a horizontal gradient weight and a vertical gradient weight of the weighted average are user programmable.

14. The method of claim 1, wherein said mapping is performed using a slicer having a programmable hysteresis threshold.

15. The method of claim 1, wherein said source scale factor is minimally affected by analog or source coding noise.

16. A computer program product comprising a non-transitory computer useable medium having computer program logic recorded thereon, the computer control logic when executed by a processor enabling the processor to process an image according to a method, the method comprising:
receiving an image;

determining a horizontal gradient and a vertical gradient of the image, the horizontal and vertical gradients respectively representing horizontal and vertical resolutions of the image;

filtering the horizontal and vertical gradients to generate filtered horizontal and vertical gradients;

calculating an overall gradient based on a weighted average of the filtered horizontal and vertical gradients;

mapping the overall gradient to a quantized level of a plurality of quantized levels; and determining a source scale factor of the image based on the quantized level.

17. The computer program product of claim 16, wherein determining the horizontal gradient and the vertical gradient of the image comprises:

for each pixel of a plurality of pixels of the image,
- calculating a local horizontal gradient using luma information of said each pixel and one or more adjacent horizontal pixels;
- calculating a local vertical gradient using luma information of said each pixel and one or more adjacent vertical pixels;
- associating the local horizontal gradient with one of a plurality of horizontal frequency bins; and
- associating the local vertical gradient with one of a plurality of vertical frequency bins.

18. The computer program product of claim 17, further comprising:

generating a histogram of local horizontal gradients, said histogram indicating for each bin of the plurality of horizontal frequency bins a respective count of local horizontal gradients associated with said each bin; and generating a histogram of local vertical gradients, said histogram indicating for each bin of the plurality of vertical frequency bins a respective count of local vertical gradients associated with said each bin.

19. The computer program product of claim 18, wherein determining the horizontal gradient and the vertical gradient of the image further comprises:

determining the horizontal gradient of the image from the histogram of local horizontal gradients; and determining the vertical gradient of the image from the histogram of local vertical gradients.

20. The computer program product of claim 19, wherein determining the horizontal gradient of the image further comprises:

iteratively integrating the histogram of local horizontal gradients starting from a highest index bin of the plurality of horizontal frequency bins to produce a running integration, until the running integration exceeds a predefined threshold;

determining a frequency bin of the plurality of horizontal frequency bins for which the running integration just exceeds the predefined threshold; and determining the horizontal gradient of the image based on an index of said determined frequency bin.

* * * * *

UNITED STATES PATENT AND TRADEMARK OFFICE
CERTIFICATE OF CORRECTION

PATENT NO.         : 8,373,801 B1                                    Page 1 of 1
APPLICATION NO.    : 13/213729
DATED              : February 12, 2013
INVENTOR(S)        : Advait Mogre It is certified that error appears in the above-identified patent and that said Letters Patent is hereby corrected as shown below:

Title Page, Item (57) Abstract, "information." should be replaced with --information,--.

In the Claims:

Column 11, Line 29, "on he" should be replaced with --on the--.

Column 11, Line 52, "*256" should be replaced with --|*256--.

Signed and Sealed this
Twenty-first Day of May, 2013

Teresa Stanek Rea
*Acting Director of the United States Patent and Trademark Office*